United States Patent
Yamazato

(10) Patent No.: US 12,050,463 B2
(45) Date of Patent: Jul. 30, 2024

(54) REMOTE SUPPORT SYSTEM AND REMOTE SUPPORT METHOD

(71) Applicant: TOYOTA JIDOSHA KABUSHIKI KAISHA, Toyota (JP)

(72) Inventor: Narihito Yamazato, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 17/656,329

(22) Filed: Mar. 24, 2022

(65) Prior Publication Data

US 2022/0308578 A1 Sep. 29, 2022

(30) Foreign Application Priority Data

Mar. 24, 2021 (JP) .................................. 2021-050650

(51) Int. Cl.
*G05D 1/00* (2024.01)
(52) U.S. Cl.
CPC ......... *G05D 1/0038* (2013.01); *G05D 1/0061* (2013.01)
(58) Field of Classification Search
CPC ............... G05D 1/0038; G05D 1/0061; G05D 2201/0213; G05D 1/0027; G05D 1/0225; G05D 1/028; G05D 1/0285; G05D 2201/0203
See application file for complete search history.

(56) References Cited

U.S. PATENT DOCUMENTS

| 10,324,463 | B1* | 6/2019 | Konrardy | G05D 1/0278 |
| 2015/0248131 | A1* | 9/2015 | Fairfield | G05D 1/0027 701/2 |
| 2016/0358475 | A1* | 12/2016 | Prokhorov | G05D 1/0088 |
| 2018/0365908 | A1* | 12/2018 | Liu | G07C 5/006 |
| 2019/0011910 | A1* | 1/2019 | Lockwood | G05D 1/0038 |
| 2019/0011912 | A1* | 1/2019 | Lockwood | G05D 1/0231 |
| 2019/0384312 | A1* | 12/2019 | Herbach | G06F 16/5854 |
| 2020/0062267 | A1* | 2/2020 | Magzimof | B60W 50/082 |
| 2020/0192351 | A1* | 6/2020 | Rastoll | G06V 20/58 |
| 2020/0310417 | A1 | 10/2020 | Pedersen et al. | |

FOREIGN PATENT DOCUMENTS

| JP | 2019-185280 A | 10/2019 |
| JP | 2019-185293 A | 10/2019 |
| JP | 2019-191982 A | 10/2019 |
| JP | 2019-207539 A | 12/2019 |

* cited by examiner

*Primary Examiner* — Kurt Philip Liethen
(74) *Attorney, Agent, or Firm* — Dickinson Wright, PLLC

(57) ABSTRACT

A remote support system includes a past record database. The past record database indicates a past record of a support request process by an automated driving vehicle for each scene. In response to a support request from a target automated driving vehicle, the remote support system requests an operator for an instruction to the target automated driving vehicle. A supported process is a vehicular process performed by the operator instead of the target automated driving vehicle. On the other hand, a delegated process is a vehicular process that the operator delegates to the target automated driving vehicle. Based on the past record database, the remote support system determines a recommendable option of a combination of the supported process and the delegated process. Then, the remote support system presents the recommendable option to the operator.

10 Claims, 12 Drawing Sheets

<PAST RECORD DATABASE>

| VEHICLE ID INFORMATION | | SCENE | | PAST RECORD OF VEHICULAR PROCESS / SUPPORT REQUEST PROCESS | | |
|---|---|---|---|---|---|---|
| ID No. | VEHICLE TYPE | POSITION | ACTION | SIGNAL RECOGNITION | ACTION DECISION | EXECUTION TIMING |
| 1 | | INTERSECTION A | RIGHT TURN | 98/100 | 40/100 | 95/100 |
| 2 | | INTERSECTION B | LEFT TURN | 45/100 | 85/100 | 60/100 |
| ... | ... | ... | ... | ... | ... | ... |

<PAST RECORD DATABASE>

| VEHICLE ID INFORMATION | | SCENE | | PAST RECORD OF VEHICULAR PROCESS / SUPPORT REQUEST PROCESS | | | |
|---|---|---|---|---|---|---|---|
| ID No. | VEHICLE TYPE | POSITION | ACTION | SIGNAL RECOGNITION | ACTION DECISION | EXECUTION TIMING | SUPPORT RE-REQUEST |
| 1 | | INTERSECTION A | RIGHT TURN | 98/100 | 40/100 | 95/100 | 5/100 |
| 2 | | INTERSECTION B | LEFT TURN | 45/100 | 85/100 | 60/100 | 15/100 |
| ... | ... | ... | ... | ... | ... | ... | ... |

REMOTE SUPPORT SYSTEM AND REMOTE SUPPORT METHOD

CROSS-REFERENCE TO RELATED APPLICATION

This application claims priority to Japanese Patent Application No. 2021-050650 filed on Mar. 24, 2021, the entire contents of which are incorporated by reference herein.

BACKGROUND

Technical Field

The present disclosure relates to a technique of remotely supporting travel of an automated driving vehicle.

Background Art

Patent Literature 1 discloses a control system for remotely controlling an automated driving vehicle. After remote control for a target vehicle is performed, the control system registers point data including position information and sensing data of the target vehicle. When performing the remote control, the control system determines whether or not the registered point data similar to current point data acquired from the target vehicle are available. When the similar registered point data are available, the control system executes a first remote control utilizing the similar registered point data without intervention by an operator. On the other hand, when the similar registered point data are not available, the control system performs a second remote control intervened by the operator.

Patent Literature 2 discloses a management device for managing a vehicle. The vehicle generates surrounding information representing a surrounding situation by the use of sensors and performs automated driving based on the surrounding information. In a situation where the automated driving is difficult, the management device acquires the surrounding information from the vehicle and selects one of remote control of the vehicle and an alternative process according to the surrounding information. The alternative process is a change in the sensor to be used or a change in a route of the automated driving.

Patent Literature 3 discloses a vehicle remote operation support system. The vehicle remote operation support system includes a vehicle that executing automated driving and a control center with an operator. When the automated driving is difficult, the vehicle transmits surrounding information to the control center and calls the operator. Based on the surrounding information, the operator inputs a parameter for selecting a travel pattern used in remote control of the vehicle. The control center selects the travel pattern based on the input parameter and generates a path of the vehicle by the use of the selected travel pattern and the surrounding information.

LIST OF RELATED ART

Patent Literature 1: Japanese Laid-Open Patent Application Publication No. JP-2019-185280
Patent Literature 2: Japanese Laid-Open Patent Application Publication No. JP-2019-207539
Patent Literature 3: Japanese Laid-Open Patent Application Publication No. JP-2019-191982

SUMMARY

It is conceivable that an operator remotely supports travel of an automated driving vehicle in response to a support request from the automated driving vehicle. Here, when a load on the operator is increased, an efficiency of the remote support may be decreased.

An object of the present disclosure is to provide a technique capable or reducing a load on an operator remotely supporting travel of an automated driving vehicle.

A first aspect is directed to a remote support system that remotely supports travel of an automated driving vehicle.

The automated driving vehicle executes:
a plurality of vehicular processes including recognition and decision during automated driving; and
a support request process that transmits, to the remote support system, a support request that requests for support for at least one of the plurality of vehicular processes.

The remote support system includes:
one or more processors; and
a past record database indicating a past record of the support request process by the automated driving vehicle for each scene.

The one or more processors are programmed to execute:
an operator instruction request process that, in response to the support request transmitted from a target automated driving vehicle being in a first scene, requests an operator for an instruction to the target automated driving vehicle; and
an operator instruction notification process that notifies the target automated driving vehicle of the instruction from the operator.

A supported process is a vehicular process performed by the operator instead of the target automated driving vehicle among the plurality of vehicular processes in the first scene.

A delegated process is a vehicular process that the operator delegates to the target automated driving vehicle among the plurality of vehicular processes in the first scene.

In the operator instruction request process, the one or more processors are further programmed to:
acquire the past record of the support request process related to the first scene from the past record database;
determine, based on the past record of the support request process related to the first scene, a recommendable option recommendable for the operator among a plurality of options of a combination of the supported process and the delegated process; and present at least the recommendable option to the operator.

A second aspect is directed to a remote support method that remotely supports travel of an automated driving vehicle.

The automated driving vehicle executes:
a plurality of vehicular processes including recognition and decision during automated driving; and
a support request process that transmits, to the remote support system, a support request that requests for support for at least one of the plurality of vehicular processes.

A past record database indicates a past record of the support request process by the automated driving vehicle for each scene.

The remote support method includes:
an operator instruction request process that, in response to the support request transmitted from a target automated driving vehicle being in a first scene, requests an operator for an instruction to the target automated driving vehicle; and
an operator instruction notification process that notifies the target automated driving vehicle of the instruction from the operator.

A supported process is a vehicular process performed by the operator instead of the target automated driving vehicle among the plurality of vehicular processes in the first scene.

A delegated process is a vehicular process that the operator delegates to the target automated driving vehicle among the plurality of vehicular processes in the first scene.

The operator instruction request process further includes:
acquiring the past record of the support request process related to the first scene from the past record database;
determining, based on the past record of the support request process related to the first scene, a recommendable option recommendable for the operator among a plurality of options of a combination of the supported process and the delegated process; and
presenting at least the recommendable option to the operator.

According to the present disclosure, the operator is requested to issue an instruction to the target automated driving vehicle in response to the support request from the target automated driving vehicle. The supported process is the vehicular process performed by the operator instead of the target automated driving vehicle. On the other hand, the delegated process is the vehicular process that the operator delegates to the target automated driving vehicle. When the delegated process increases and thus the supported process decreases, the number of items that the operator should decide decreases accordingly. This contributes to reduction in the load on the operator.

Furthermore, according to the present disclosure, a recommendable option of the combination of the supported process and the delegated process is determined based on the past record database indicating the past record of the support request process. Then, the recommendable option is presented to the operator. By referring to the recommendable option, the operator is able reduce a time for considering which vehicular process to set as the delegated process. As a result, the load on the operator is reduced.

Since the load on the operator is reduced, a time required for the operator to deal with a single support request (i.e., a single target automated driving vehicle) is reduced. As a result, an efficiency of the remote support is increased. This means that a larger number of support requests (target automated driving vehicles) can be handled by a limited number of operators. This is preferable in terms of costs. According to the present disclosure, it is possible to increase the efficiency of the remote support with suppressing increase in costs.

BRIEF DESCRIPTION OF DRAWINGS

FIG. 8 is a conceptual diagram showing an example of a past record database according to an embodiment of the present disclosure;

FIG. 9 is a conceptual diagram showing another example of a past record database according to an embodiment of the present disclosure;

EMBODIMENTS

Embodiments of the present disclosure will be described with reference to the accompanying drawings.

1. Outline of Remote Support

Figure 1:
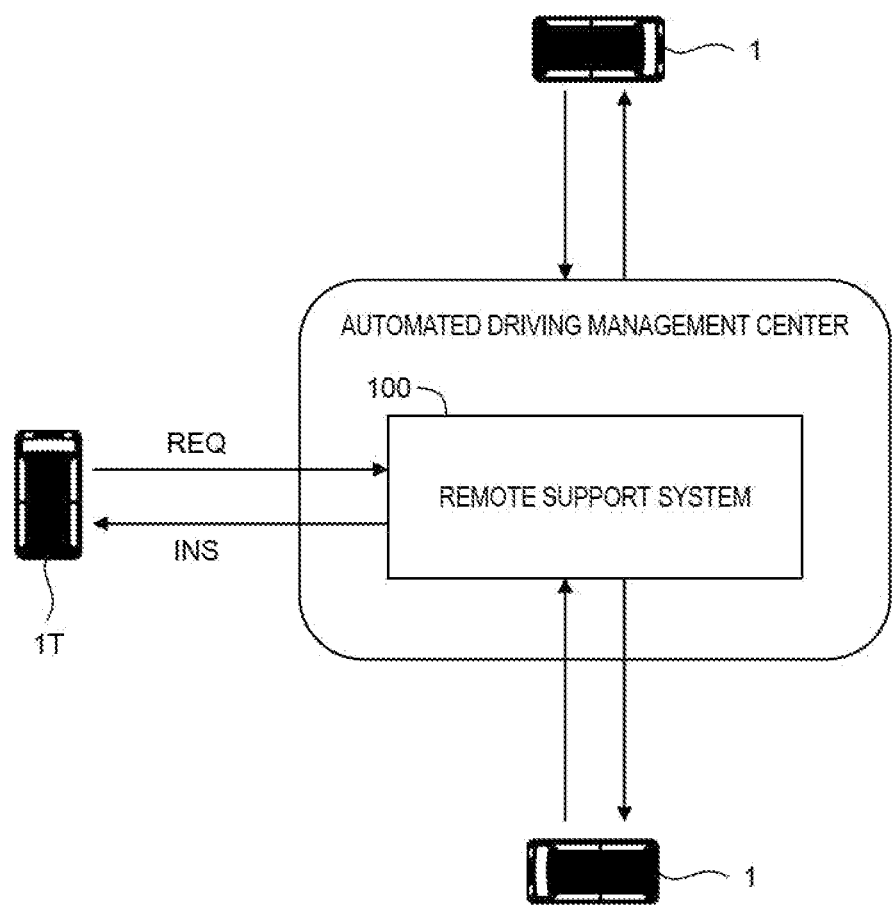
FIG. 1 is a conceptual diagram for explaining an outline of remote support according to an embodiment of the present disclosure.

FIG. 1 is a conceptual diagram for explaining an outline of remote support according to the present embodiment. An automated driving vehicle 1 is a vehicle capable of automated driving. The automated driving supposed here is one where a driver may not necessarily 100% concentrate on the driving (e.g., so-called Level 3 or higher level automated driving). The automated driving vehicle 1 may be an automated driving vehicle of Level 4 or higher that does not need a driver. For example, the automated driving vehicle 1 is an automated driving bus that runs in a limited area.

The remote support system 100 is installed, for example, in an automated driving management center of an area in which many automated driving vehicles 1 travel. The automated driving vehicle 1 and the remote support system 100 are capable of communicating with each other. The remote support system 100 communicates with the automated driving vehicle 1 and remotely supports travel of the automated driving vehicle 1. More specifically, a human operator remotely supports the travel of the automated driving vehicle 1 through the remote support system 100. It can be said that the remote support system 100 is a system for assisting the operator's remote support for the automated driving vehicle 1.

Figure 2:
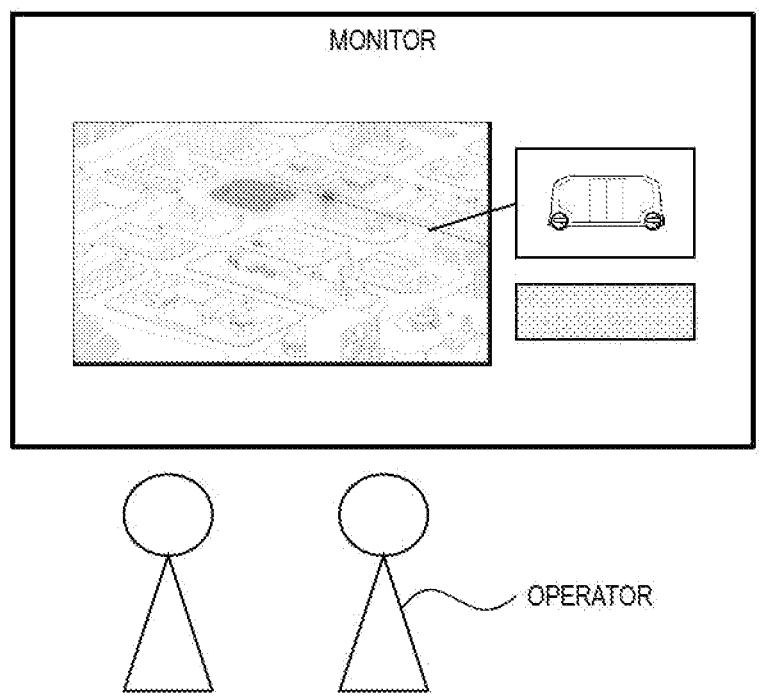
FIG. 2 is a conceptual diagram for explaining an outline of a remote support system according to an embodiment of the present disclosure.

For example, as shown in FIG. 2, the remote support system 100 includes a monitor (display). The monitor displays a variety of information such as a situation of the area, a position and a state (status) of each automated driving vehicle 1, and the like. The operator monitors the information displayed on the monitor. Then, the operator remotely supports the travel of the automated driving vehicle 1, if required.

Typically, a situation where the remote support by the operator is necessary is a situation where the automated driving is difficult. The automated driving vehicle 1 executes a variety of vehicular processes during the automated driving. Examples of typical vehicular processes executed during the automated driving are as follows.

(1) Recognition process: the automated driving vehicle 1 recognizes a situation around the automated driving vehicle 1 by using a recognition sensor. For example, the automated driving vehicle 1 uses a camera to recognize signal indication of a traffic signal (e.g., green light, yellow light, red light, right-turn, etc.).

(2) Action decision process: the automated driving vehicle 1 decides, based on a result of the recognition process, whether or not to execute an action. Examples of the action of the automated driving vehicle 1 include start, stop, right turn, left turn, lane change, and the like.

(3) Timing decision process: the automated driving vehicle 1 decides an execution timing of the action.

For example, when a traffic signal installed at an intersection is exposed to sunlight, accuracy of recognition of the signal indication may be deteriorated. If it is not possible to accurately determine the signal indication by the recognition process, the automated driving vehicle 1 needs the operator's remote support for the signal recognition. Moreover, if it is not possible to determine the signal indication, it is also difficult to decide what action to take at what timing. Therefore, the automated driving vehicle 1 further needs the operator's remote support for the action decision process and the timing decision process.

Even when the signal indication is determined, a situation where it is difficult to decide whether or not to actually execute an action is conceivable. For example, there is a possibility that an oncoming vehicle enters the intersection or an oncoming vehicle or a preceding vehicle stays within the intersection even after the signal indication as seen from the automated driving vehicle 1 becomes "right-turn OK." In that case, the automated driving vehicle 1 may request the operator's remote support for the action decision process and the timing decision process while being stopped.

As yet another example, a situation where a parked vehicle exists on a lane ahead of the automated driving vehicle 1 and it is difficult to decide whether or not to make a lane change is also conceivable. For example, when there is a sign that the parked vehicle start moving, it is difficult to decide whether or not to make a lane change. As another example, in a section where a lane change is prohibited, there is no action that can be taken except for stopping. In such a case, the automated driving vehicle 1 may stop in front of the parked vehicle and request the operator's remote support for the action decision process.

As yet another example, in a road work zone, the automated driving vehicle 1 may request the operator's remote support. As yet another example, when the automated driving vehicle 1 is failed, the automated driving vehicle 1 may request the operator's remote support.

When the remote support by the operator is necessary, the automated driving vehicle 1 transmits a "support request REQ" to the remote support system 100. The support request REQ requests support for at least one of the plurality of vehicular processes (i.e., the recognition process, the action decision process, and the timing decision process) described above. This process executed by the automated driving vehicle 1 is hereinafter referred to as a "support request process." The automated driving vehicle 1 that executes the support request process is hereinafter referred to as a "target automated driving vehicle 1T." The support request REQ may include results of the vehicular processes in the target automated driving vehicle 1T as reference information.

The remote support system 100 receives the support request REQ from the target automated driving vehicle 1T. The remote support system 100 notifies the operator of the received support request REQ and requests the operator for an instruction to the target automated driving vehicle 1T. This process executed by the remote support system 100 is hereinafter referred to as an "operator instruction request process."

The operator determines an "operator instruction INS", which is an instruction to the target automated driving vehicle 1T, according to contents of the support request REQ. The operator inputs the operator instruction INS to the remote support system 100. The remote support system 100 communicates with the target automated driving vehicle 1T and notifies the target automated driving vehicle 1T of the operator instruction INS. This process executed by the remote support system 100 is hereinafter referred to as an "operator instruction notification process."

The remote support process executed by the remote support system 100 includes the "operator instruction request process" and the "operator instruction notification process" described above.

The target automated driving vehicle 1T receives the operator instruction INS from the remote support system 100. Then, the target automated driving vehicle 1T resumes the automated driving in accordance with the operator instruction INS.

It is also conceivable that the automated driving is still difficult even after receiving the operator instruction INS. In this case, the target automated driving vehicle 1T may retransmit the support request REQ to the remote support system 100 without following the received operator instruction INS. This process is hereinafter referred to as a "support re-request process."

2. Reduction in Load on Operator

2-1. Outline

As described above, the operator remotely supports the travel of the target automated driving vehicle 1T in response to the support request REQ from the target automated driving vehicle 1T. Here, when a load on the operator is increased, an efficiency of the remote support may be decreased.

For example, a situation in which many support requests REQ are transmitted from a large number of target automated driving vehicles 1T one after another is considered. The operator needs to quickly handle the many support requests REQ that arise one after another. When handling of the support request REQ is delayed, the efficiency of the remote support is decreased.

It may be considered to prepare a large number of operators and have the large number of operators separately handle the many support requests REQ. However, the operator carrying out the remote support is a high level person requiring specialist skills. Increasing the number of operators being such the high level persons has a limit in terms of costs and education.

In order to improve the efficiency of the remote support, it is important to reduce the load on the operator. For this purpose, it is effective to reduce the number of items that the operator should consider and decide with regard to a single support request REQ. This reduces a time required for the operator to deal with a single support request REQ (i.e., a single target automated driving vehicle 1T). As a result, the efficiency of the remote support is improved.

In view of the above, according to the present embodiment, concept of a "supported process" and a "delegated process" is introduced. The supported process is a vehicular process performed by the operator instead of the target automated driving vehicle 1T among the plurality of vehicular processes (i.e., the recognition process, the action decision process, and the timing decision process) described above. On the other hand, the delegated process is a vehicular process that the operator delegates (leaves) to the target automated driving vehicle 1T among the plurality of vehicular processes (i.e., the recognition process, the action decision process, and the timing decision process) described above.

When the delegated process increases and thus the supported process decreases, the number of items that the operator should decide decreases accordingly. This is preferable in terms of reduction in the load on the operator. However, in order to determine which vehicular process to set the delegated process, it is necessary to comprehensively consider a variety of information. Moreover, a variety of information to be considered differs for each target automated driving vehicle 1T and also varies depending on a situation in which the target automated driving vehicle 1T is. Such the considering eventually becomes the load on the operator.

In view of the above, the remote support system 100 according to the present embodiment is configured to present useful information contributing to reduction in the operator's consideration time to the operator in the operator instruction request process. There are a plurality of options OPT of a combination of the supported process and the delegated process. The remote support system 100 automatically determines one option recommendable for the operator among the plurality of options OPT as a "recommendable option OPT1." Then, the remote support system 100 presents at least the recommendable option OPT1 to the operator. By referring to the recommendable option OPT1, the operator is able reduce the time for considering which vehicular process to set as the delegated process. As a result, the load on the operator is reduced.

2-2. Remote Support Process Based on Past Record Database

Figure 3:
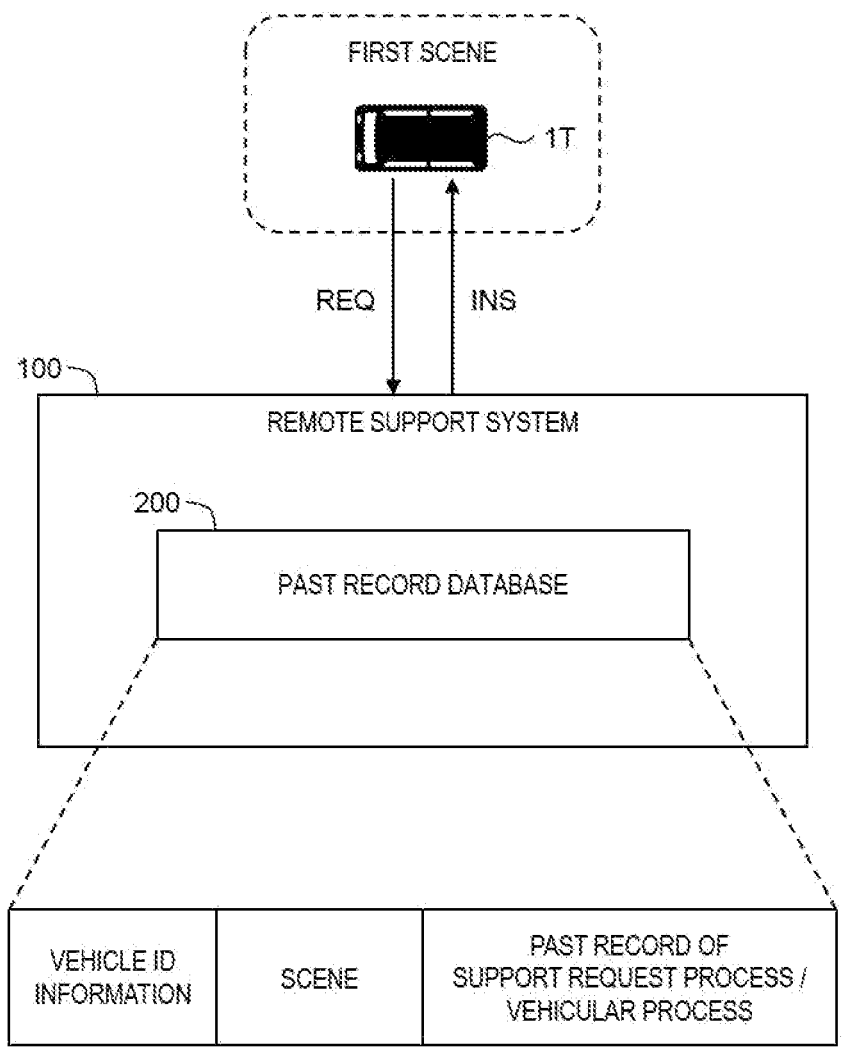
FIG. 3 is a conceptual diagram for explaining a remote support process by a remote support system according to an embodiment of the present disclosure.

FIG. 3 is a conceptual diagram for explaining the remote support process by the remote support system 100 according to the present embodiment. The remote support system 100 includes a past record database 200. The past record database 200 indicates at least a past record of the support request process by each automated driving vehicle 1 for each scene.

The scene is a situation in which the automated driving vehicle 1 is placed. More specifically, the scene includes a position where there is a possibility that the support request process is performed by the automated driving vehicle 1. Examples of the position where the support request process is performed include an intersection, a lane merging section, a road work zone, and the like. Each position is defined by ranges of latitude and longitude. The scene may include not only the position but also an action of the automated driving vehicle 1. Examples of the scene including the position and the action include "turn right at an intersections," "make a lane change at a lane merging section," and the like.

The past record of the support request process in a scene includes, for example, a probability that the support for the vehicular process has been requested in that scene. For example, suppose that a certain automated driving vehicle 1 has passed through a certain intersection 100 times in the past. The recognition process that recognizes the signal indication at the intersection has succeeded 98 times and failed 2 times. When the recognition of the signal indication fails, the automated driving vehicle 1 requests a support for the recognition process. Therefore, a past support request probability for the recognition process at the intersection is 2%. When the past support request probability for the recognition process is low, it is considered that assigning the recognition process to the delegated process is unlikely to cause a problem.

As described above, the past record database 200 indicating the past record of the support request process for each scene is useful for determining the recommendable option OPT1. It should be noted that in the above example, the support request probability is 2% and the recognition success probability is 98%. "The past record of the support request process" and "the past record of the vehicular process" are two sides of the same record, and it can be said that they are equivalent. Therefore, it is also possible to say that the past record database 200 indicates the past record of the plurality of vehicular processes by the automated driving vehicle 1 for each scene.

Each time the automated driving vehicle 1 experiences a scene, the automated driving vehicle 1 transmits information indicating the scene and a result of each vehicular process (i.e., the recognition process, the action decision process, and the timing decision process) to the remote support system 100. When the automated driving vehicle 1 performs a support request process, the automated driving vehicle 1 transmits information indicating contents of the support request process (e.g., which vehicular process the support is requested for) to the remote support system 100. The remote support system 100 collects such the information from each automated driving vehicle 1. The remote support system 100 updates the past record database 200 by registering the collected information in the past record database 200. As shown in FIG. 3, the past record database 200 indicates a correspondence relationship between identification information of each automated driving vehicle 1, the scene, and the past record of the support request process.

Meanwhile, a support request REQ is transmitted from the target automated driving vehicle 1T being in a certain scene to the remote support system 100. For convenience, the scene in which the target automated driving vehicle 1T exists is hereinafter referred to as a "first scene." In response to the support request REQ, the remote support system 100 performs the operator instruction request process that requests the operator for an instruction to the target automated driving vehicle 1T.

In the operator instruction request process, the remote support system 100 first acquires the past record of the support request process related to the first scene from the past record database 200. The support request process related to the first scene includes the support request process in the first scene itself. The support request process related to the first scene may include the support request process in a similar scene similar to the first scene. For example, when the first scene is "right turn at an intersection A", "right turn at an intersection B having the same structure as the intersection A" is the similar scene.

The past record of the support request process acquired from the past record database 200 includes at least the past record of the support request process by the target automated driving vehicle 1T itself. That is, the remote support system 100 acquires the past record of the support request process related to the first scene performed by the target automated driving vehicle 1T from the past record database 200.

As a modification example, the remote support system 100 may acquire the past record of the support request process by another automated driving vehicle 1, in addition to the past record of the support request process by the target automated driving vehicle 1T. In this case, the remote support system 100 combines the past records of the support request processes by the target automated driving vehicle 1T and another automated driving vehicle 1 with weighting. Here, a weight for the target automated driving vehicle 1T is set to be greater than a weight for another automated driving vehicle 1.

Subsequently, the remote support system 100 determines the "recommendable option OPT1" of the combination of the supported process and the delegated process, based on the past record of the support request process related to the first scene. The supported process is a vehicular process performed by the operator instead of the target automated driving vehicle 1T among the plurality of vehicular processes in the first scene. On the other hand, the delegated process is a vehicular process that the operator delegates (leaves) to the target automated driving vehicle 1T among the plurality of vehicular processes in the first scene. Then, the remote support system 100 presents at least the recommendable option OPT1 to the operator. The remote support system 100 may present the plurality of options OPT including the recommendable option OPT1 to the operator.

Figure 4:
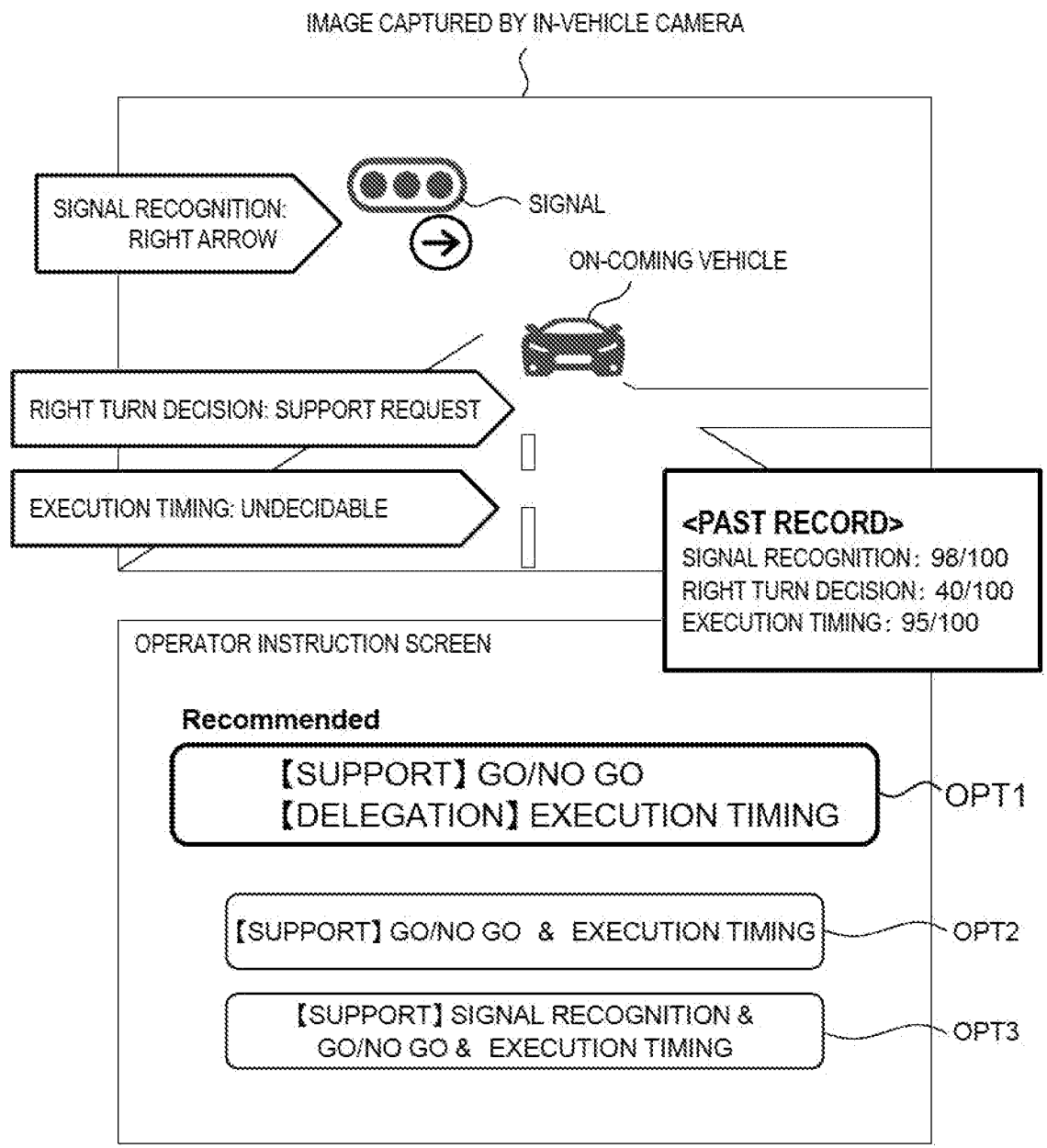
FIG. 4 is a conceptual diagram for explaining an example of an operator instruction request process by a remote support system according to an embodiment of the present disclosure.

FIG. 4 is a conceptual diagram for explaining an example of the operator instruction request process according to the present embodiment. More specifically, FIG. 4 shows an example of information displayed on the monitor that the operator sees. The image (video) captured by the camera installed on the target automated driving vehicle 1T is displayed on the monitor. The image information is transmitted in real time from the target automated driving vehicle 1T to the remote support system 100 via communication. The remote support system 100 displays the image information on the monitor.

In the example shown in FIG. 4, the target automated driving vehicle 1T issues the support request REQ when making a right turn at a first intersection. That is, the first scene is the right turn at the first intersection. The target automated driving vehicle 1T performs the recognition process to recognize signal indication of a traffic signal installed at the first intersection. In the present example, the target automated driving vehicle 1T recognizes the signal indication as "right arrow" with high accuracy. Therefore, the target automated driving vehicle 1T judges that the operator's remote support for the signal recognition is not necessary.

On the other hand, in the present example, the target automated driving vehicle 1T has no confidence in deciding whether or not to execute a right turn. As a result, it is not possible to decide a timing to execute the right turn. In such the situation, the target automated driving vehicle 1T transmits the support request REQ to the remote support system 100. The support request REQ requests for support for the action decision process (right turn decision process) and the timing decision process. The support request REQ may include the result each of the recognition process (signal recognition), the action decision process, and the timing decision process in the target automated driving vehicle 1T. In that case, each result also is displayed on the monitor, as shown in FIG. 4.

In the operator instruction request process, the remote support system 100 acquires the past record of the support request process related to the first scene from the past record database 200. For example, the past records of each vehicular process and the support request process by the target automated driving vehicle 1T in the first scene are as follows.

[Recognition process (Signal recognition)]Success probability=98%,Support request probability=2%

[Action decision process (Right turn decision)]Success probability=40%,Support request probability=60%

[Timing decision process]Success probability=95%, Support request probability=5%

As for the vehicular process whose past support request probability is sufficiently low, there is no problem even when it is delegated to the target automated driving vehicle 1T. Therefore, the remote support system 100 recommends the operator to delegate (leave) the timing decision process to the target automated driving vehicle 1T. On the other hand, as for the vehicular process whose past support request probability is high, the operator's support is desirable. Therefore, the remote support system 100 recommends the operator to support the action decision process. That is to say, the recommendable option OPT1 is "support the action decision process but delegate the timing decision process to the target automated driving vehicle 1T."

The remote support system 100 presents at least the recommendable option OPT1 to the operator. For example, as shown in FIG. 4, the recommendable option OPT1 is displayed on an operator instruction screen. The recommendable option OPT1 may be accompanied by letters "Recommended." By referring to the recommendable option OPT1, the operator is able reduce the time for considering which vehicular process to set as the delegated process. As a result, the load on the operator is reduced.

It should be noted that the operator need not necessarily follow the recommendable option OPT1. In some cases, the operator may issue an instruction different from the recommendable option OPT1. Even in that case, the fact remains that the effects of reduction in consideration time and reduction in load are obtained.

As shown in FIG. 4, a plurality of options OPT including the recommendable option OPT1 may be presented to the operator. For example, an option OPT2 is "support both the action decision process and the timing decision process." An option OPT3 is "support all of the recognition process, the action decision process, and the timing decision process." The option OPT3 proposes the operator to support also the recognition process whose support is not requested from the target automated driving vehicle 1T. When the plurality of options OPT including the recommendable option OPT1 are presented to the operator, the operator is able to easily make a comparison between the plurality of options OPT. This also contributes to reduction in the consideration time.

When the plurality of options OPT are presented to the operator, it is preferable that the recommendable option OPT1 is presented so as to stand out from the other options. For example, as shown in FIG. 4, a character size of the recommendable option OPT1 is greater than a character size of the other options OPT2 and OPT3. Characters of the recommendable option OPT1 may be thicker than characters of the other options OPT2 and OPT3. This makes it easier for the operator to perceive the recommendable option OPT1.

2-3. Effects

As described above, according to the present embodiment, the remote support system 100 requests the operator for an instruction to the target automated driving vehicle 1T in response to the support request REQ from the target automated driving vehicle 1T. The supported process is the vehicular process performed by the operator instead of the target automated driving vehicle 1T. On the other hand, the delegated process is the vehicular process that the operator delegates to the target automated driving vehicle 1T. When the delegated process increases and thus the supported process decreases, the number of items that the operator should decide decreases accordingly. This contributes to reduction in the load on the operator.

Furthermore, according to the present embodiment, the remote support system 100 determines the recommendable option OPT1 of the combination of the supported process and the delegated process based on the past record database 200 indicating the past record of the support request process. Then, the remote support system 100 presents the recommendable option OPT1 to the operator. By referring to the recommendable option OPT1, the operator is able reduce a time for considering which vehicular process to set as the delegated process. As a result, the load on the operator is reduced.

Since the load on the operator is reduced, a time required for the operator to deal with a single support request REQ (i.e., a single target automated driving vehicle 1T) is reduced. As a result, the efficiency of the remote support is increased. This means that a larger number of support requests REQ (target automated driving vehicles 1T) can be handled by a limited number of operators. This is preferable in terms of costs. According to the present embodiment, it is possible to increase the efficiency of the remote support with suppressing increase in costs.

It should be noted that the remote support system 100 according to the present embodiment does not fully automatically perform the remote support without through the operator. Contents of the final instruction (i.e., the operator instruction INS) to the target automated driving vehicle 1T are determined by the operator. Therefore, accuracy of the remote support is secured. Moreover, the operator need not necessarily follow the recommendable option OPT1. In some cases, the operator may issue an instruction different from the recommendable option OPT1. Therefore, flexibility of the remote support is secured.

Hereinafter, concrete examples of the automated driving vehicle 1 and the remote support system 100 according to the present embodiment will be described in more details.

3. Automated Driving Vehicle

3-1. Configuration Example

Figure 5:
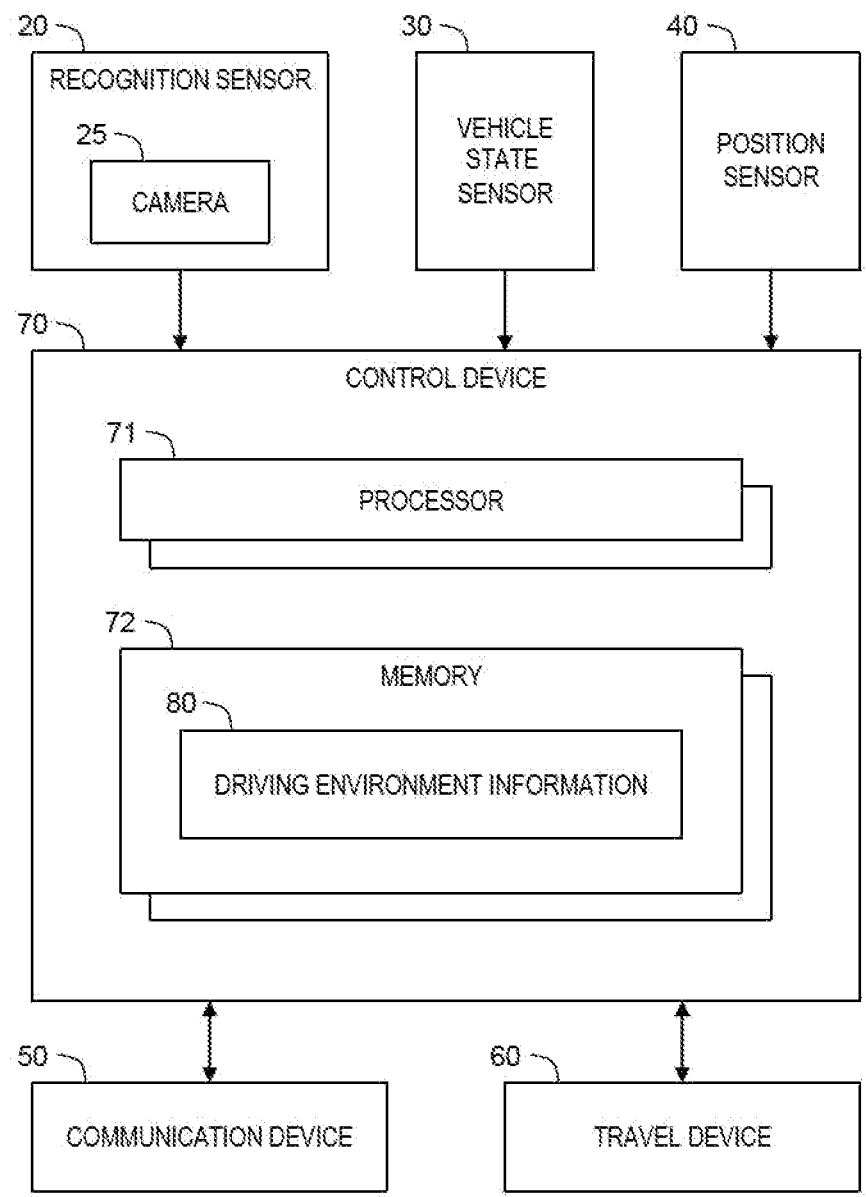
FIG. 5 is a block diagram showing a configuration example of an automated driving system installed on an automated driving vehicle according to an embodiment of the present disclosure.

FIG. 5 is a block diagram showing a configuration example of an automated driving system 10 installed on the automated driving vehicle 1 according to the present embodiment. The automated driving system 10 includes a recognition sensor 20, a vehicle state sensor 30, a position sensor 40, a communication device 50, a travel device 60, and a control device 70.

The recognition sensor 20 recognizes (detects) a situation around the automated driving vehicle 1. The recognition sensor 20 includes at least a camera 25. The recognition sensor 20 may further include a LIDAR (Laser Imaging Detection and Ranging), a radar, and the like.

The vehicle state sensor 30 detects a state of the automated driving vehicle 1. For example, the vehicle state sensor 30 includes a vehicle speed sensor, an acceleration sensor, a yaw rate sensor, a steering angle sensor, and the like.

The position sensor 40 detects a position and an orientation of the automated driving vehicle 1. The position sensor 40 is exemplified by a GPS (Global Positioning System) sensor.

The communication device 50 communicates with the outside of the automated driving vehicle 1. For example, the communication device 50 communicates with the remote support system 100.

The travel device 60 includes a steering device, a driving device, and a braking device. The steering device turns wheels of the automated driving vehicle 1. For example, the steering device includes an electric power steering (EPS) device. The driving device is a power source that generates a driving force. Examples of the drive device include an engine, an electric motor, an in-wheel motor, and the like. The braking device generates a braking force.

The control device (controller) 70 controls the automated driving vehicle 1. The control device 70 includes one or more processors 71 (hereinafter simply referred to as a processor 71) and one or more memories 72 (hereinafter simply referred to as a memory 72). The processor 71 executes a variety of processing. For example, the processor 71 includes a CPU (Central Processing Unit). The memory 72 stores a variety of information. Examples of the memory 72 include a volatile memory, a non-volatile memory, an HDD (Hard Disk Drive), an SSD (Solid State Drive), and the like. The variety of processing by the processor 71 (the control device 70) is implemented by the processor 71 executing a control program being a computer program. The control program is stored in the memory 72 or recorded on a non-transitory computer-readable recording medium. The control device 70 may include one or more ECUs (Electronic Control Units). A part of the control device 70 may be an information processing device outside the automated driving vehicle 1. In that case, the part of the control device 70 communicates with the automated driving vehicle 1 and remotely controls the automated driving vehicle 1.

3-2. Information Acquisition Process

The processor 71 acquires driving environment information 80 indicating a driving environment for the automated driving vehicle 1. The driving environment information 80 is stored in the memory 72.

Figure 6:
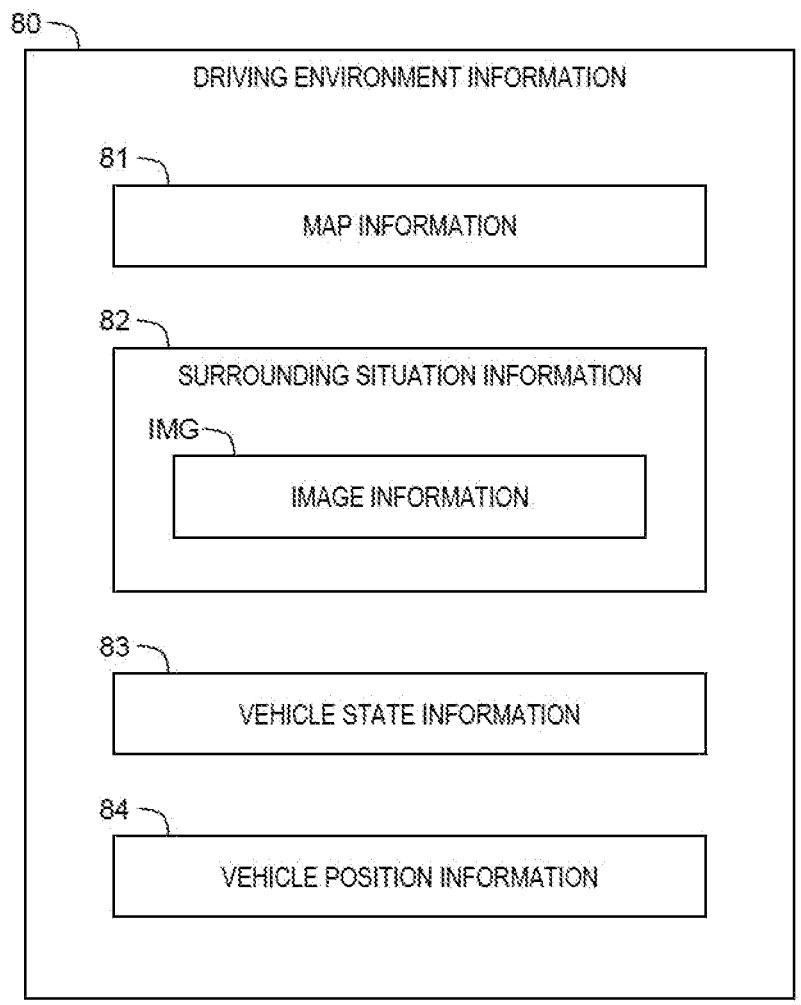
FIG. 6 is a block diagram showing an example of driving environment information according to an embodiment of the present disclosure.

FIG. 6 is a block diagram showing an example of the driving environment information 80. The driving environment information 80 includes map information 81, surrounding situation information 82, vehicle state information 83, and vehicle position information 84.

The map information 81 indicates a lane configuration, a road shape, and the like. The processor 71 acquires the map information 81 of a necessary area from a map database. The map database may be stored in a predetermined storage device installed on the automated driving vehicle 1, or may be stored in a management server outside the automated driving vehicle 1. In the latter case, the processor 71 communicates with the management server to acquire the necessary map information 81.

The surrounding situation information 82 is information indicating a situation around the automated driving vehicle 1. The surrounding situation information 82 includes information acquired by the recognition sensor 20. For example, the surrounding situation information 82 includes image information IMG captured by the camera 25. As another example, the surrounding situation information 82 includes measurement information measured by the LIDAR and/or the radar.

Moreover, the surrounding situation information 82 includes object information regarding an object around the automated driving vehicle 1. Examples of the object around the automated driving vehicle 1 include a pedestrian, another vehicle (e.g., a preceding vehicle, a parked vehicle, etc.), a sign, a white line, a roadside structure, an obstacle, and the like. The object information indicates a relative position and a relative velocity of the object with respect to the automated driving vehicle 1. For example, analyzing the image information IMG obtained by the camera 25 makes it possible to identify the object and calculate the relative position of the object. It is also possible to identify the object and acquire the relative position and the relative velocity of the object, based on the measurement information by the LIDAR and/or the radar.

Furthermore, the surrounding situation information 82 includes signal indication information indicating a result of recognition of signal indication of a traffic signal. The processor 71 detects a traffic signal around the automated driving vehicle 1 based on the image information IMG captured by the camera 25. Further, the processor 71 recognizes the signal indication of the traffic signal (e.g., green light, yellow light, red light, right-turn, etc.) based on the image information IMG. Image analysis techniques for detecting (extracting) a traffic signal from an image and recognizing its signal indication are well known.

The vehicle state information 83 is information indicating the state of the automated driving vehicle 1. Examples of the state of the automated driving vehicle 1 include a vehicle speed, a yaw rate, a lateral acceleration, a steering angle, and the like. The processor 71 acquires the vehicle state information 83 from a result of detection by the vehicle state sensor 30.

The vehicle position information 84 indicates the position and the orientation of the automated driving vehicle 1. The vehicle position information 84 is acquired by the position sensor 40. In addition, the processor 71 may acquire highly accurate vehicle position information 84 by performing a well-known localization using the map information 81 and the surrounding situation information 82 (the object information).

3-3. Vehicle Travel Control

The processor 71 executes "vehicle travel control" that controls travel of the automated driving vehicle 1. The vehicle travel control includes steering control, acceleration control, and deceleration control. The processor 71 executes the vehicle travel control by controlling the travel device 60. More specifically, the processor 71 executes the steering control by controlling the steering device. The processor 71 executes the acceleration control by controlling the driving device. The processor 71 executes the deceleration control by controlling the braking device.

3-4. Automated Driving Control

The processor 71 executes the automated driving control based on the driving environment information 80. The automated driving supposed here is one where the driver may not necessarily 100% concentrate on the driving (e.g., so-called Level 3 or higher level automated driving).

During the automated driving, the processor 71 executes the vehicular processes described above. Examples of the vehicular processes are as follows:

(1) Recognition process: the processor 71 recognizes the situation around the automated driving vehicle 1 by using the recognition sensor 20. For example, the processor 71 uses the camera 25 to recognize the signal indication of the traffic signal (e.g., green light, yellow light, red light, right-turn, etc.).

(2) Action decision process: the processor 71 decides, based on a result of the recognition process, whether or not to execute an action. Examples of the action of the automated driving vehicle 1 include start, stop, right turn, left turn, lane change, and the like.

(3) Timing decision process: the processor 71 decides an execution timing of the action.

When executing the above-described action, the processor 71 generates a target trajectory of the automated driving vehicle 1 based on the driving environment information 80. The target trajectory includes a target position and a target velocity. Then, the processor 71 executes the vehicle travel control such that the automated driving vehicle 1 follows the target trajectory.

3-5. Support Request Process

When the remote support by the operator is necessary, the processor 71 transmits the support request REQ to the remote support system 100. More specifically, the processor 71 communicates with the remote support system 100 through the communication device 50 and transmits the support request REQ to the remote support system 100. Typically, the situation where the remote support by the operator is necessary is a situation where the automated driving is difficult. Therefore, the support request REQ requests support for at least one of the plurality of vehicular processes (i.e., the recognition process, the action decision process, and the timing decision process) described above. The support request REQ may include results of the vehicular processes as reference information.

Together with support request REQ, the processor 71 transmits the driving environment information 80 necessary for the remote support to the remote support system 100. The driving environment information 80 necessary for the remote support includes at least the image information IMG captured by the camera 25. The processor 71 transmits the latest image information IMG to the remote support system 100. In addition, the processor 71 may transmit, to the remote support system 100, the image information IMG captured in a certain period of time prior to issuance of the support request REQ. Besides, the processor 71 may transmit necessary vehicle state information 83 and the like to the remote support system 100.

3-6. Automated Driving Control According to Operator Instruction

After transmitting the support request REQ, the processor 71 receives the operator instruction INS from the remote support system 100 through the communication device 50. The operator instruction INS includes an instruction from the operator regarding the supported process. The operator instruction INS may also include designation of the delegated process. The processor 71 resumes the automated driving control in accordance with the operator instruction INS. Here, as for the vehicular process designated as the delegated process, the processor 71 performs recognition or decision by itself without relying on an instruction from the operator.

3-7. Support Re-Request Process

It is also conceivable that the automated driving is still difficult even after receiving the operator instruction INS. In this case, the processor 71 retransmits the support request REQ to the remote support system 100 without following the received operator instruction INS. The support request REQ may indicate that "this time is the support re-request."

4. Remote Support System

4-1. Configuration Example

Figure 7:
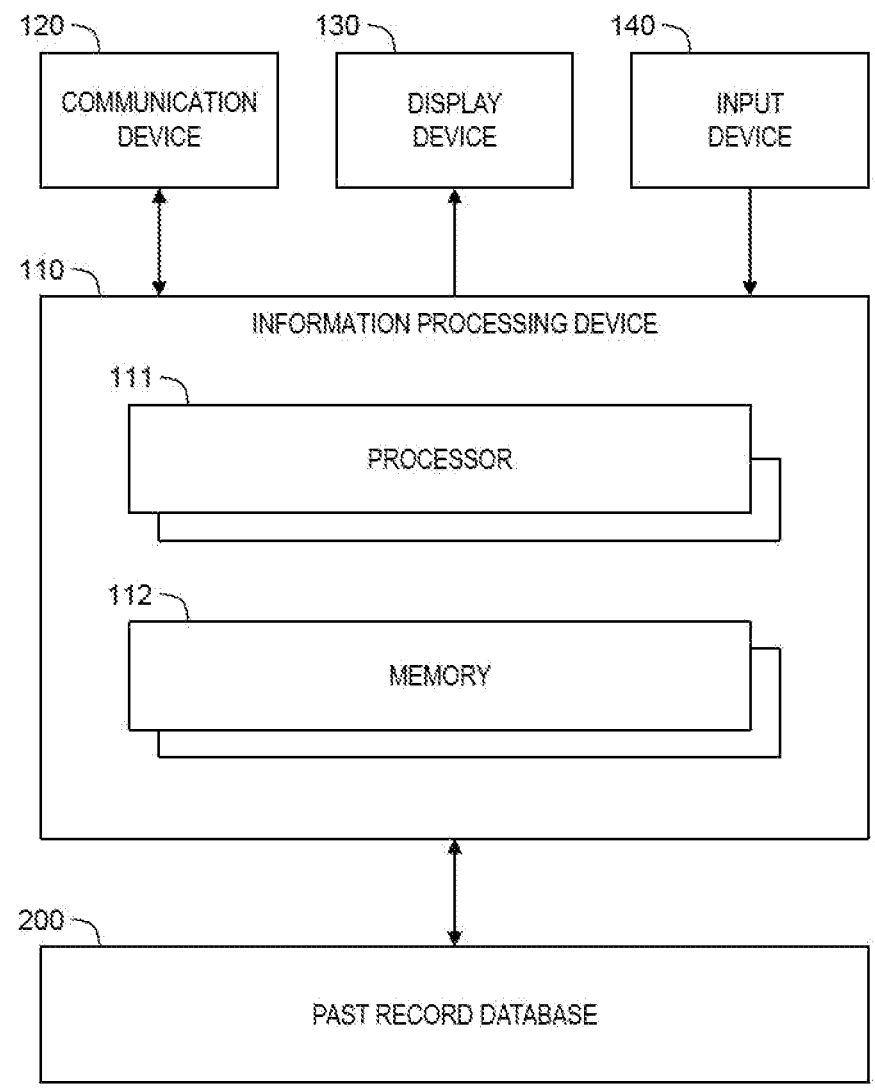
FIG. 7 is block diagram showing a configuration example of a remote support system according to an embodiment of the present disclosure.

FIG. 7 is a block diagram showing a configuration example of the remote support system 100 according to the present embodiment. The remote support system 100 includes an information processing device 110, a communication device 120, a display device 130, an input device 140, and the past record database 200.

The information processing device 110 executes a variety of information processing. The information processing device 110 includes one or more processors 111 (hereinafter simply referred to as a processor 111) and one or more memories 112 (hereinafter simply referred to as a memory 112). The processor 111 executes a variety of processing. For example, the processor 111 includes a CPU. The memory 112 stores a variety of information. Examples of the memory 112 include a volatile memory, a non-volatile memory, an HDD, an SSD, and the like. The functions of the information processing device 110 are implemented by the processor 111 executing a remote support program being a computer program. The remote support program is stored in the memory 112. The remote support program may be recorded on a non-transitory computer-readable recording medium. The remote support program may be provided via a network.

The communication device 120 communicates with the outside. For example, the communication device 120 communicates with the automated driving vehicle 1.

The display device 130 displays a variety of information. Examples of the display device 130 include a liquid crystal display, an organic EL display, a head-mounted display, a touch panel, and the like. It should be noted that the display device 130 corresponds to the monitor shown in FIG. 2.

The input device 140 is an interface for accepting input from the operator. Examples of the input device 140 include a touch panel, a keyboard, a mouse, and the like.

4-2. Past Record Database

The information processing device 110 is able to access the past record database 200. The past record database 200 indicates the past record of the vehicular process and the support request process by each automated driving vehicle 1 for each scene.

FIG. 8 is a conceptual diagram showing an example of the past record database 200. The past record database 200 indicates a correspondence relationship between vehicle ID information, the scene, and the past record.

The vehicle ID information includes an ID number given to each automated driving vehicle 1. The vehicle ID information may include a vehicle type of each automated driving vehicle 1 (e.g., normal, midsize, large, bus, etc.).

The scene includes a position where there is a possibility that the support request process is performed by the automated driving vehicle 1. Examples of the position where the support request process is performed include an intersection, a lane merging section, a road work zone, and the like. Each position is defined by ranges of latitude and longitude. The scene may include not only the position but also the action of the automated driving vehicle 1.

The past record includes, for example, a support request probability for each of the plurality of vehicular processes. The support request probability is a ratio of the number of occurrences of the support request process to the number of times that the automated driving vehicle 1 experiences the scene. It should be noted that the support request probability and a success probability of the vehicular process are two sides of the same situation, and it can be said that they are equivalent. In the example shown in FIG. 8, the past record represents the success probability of each of the plurality of vehicular processes.

As another example, the past record may include a support request frequency for each of the plurality of vehicular processes. The support request frequency is calculated based on the number of occurrences of the support request process in a certain period of time in the past.

FIG. 9 is a conceptual diagram showing another example of the past record database 200. In the example shown in FIG. 9, the past record indicated by the past record database 200 further includes a past record of the support re-request process. For example, the past record of the support re-request process includes a support re-request probability. The support re-request probability is a ratio of the number of occurrences of the support re-request process to the number of times of the operator-instruction INS.

As another example, the past record of the support re-request process may include a support re-request frequency. The support re-request frequency is calculated based on the number of occurrences of the support re-request process in a certain period of time in the past.

Each time the automated driving vehicle 1 experiences a scene, the automated driving vehicle 1 transmits information indicating the scene and a result of each vehicular process to the remote support system 100. When the automated driving vehicle 1 performs a support request process, the automated driving vehicle 1 transmits information indicating contents of the support request process (e.g., which vehicular process the support is requested for) to the remote support system 100. The processor 111 receives the information from the automated driving vehicle 1 through the communication device 120. The processor 111 updates the past record database 200 by registering the collected information in the past record database 200.

4-3. Remote Support Process

The processor 111 executes the remote support process. The remote support process includes the "operator instruction request process" that requests the operator for an instruction to the target automated driving vehicle 1T in response to the support request REQ transmitted from the target automated driving vehicle 1T. The remote support process further includes the "operator instruction notification process" that notifies the target automated driving vehicle 1T of the operator instruction INS from the operator.

Figure 10:
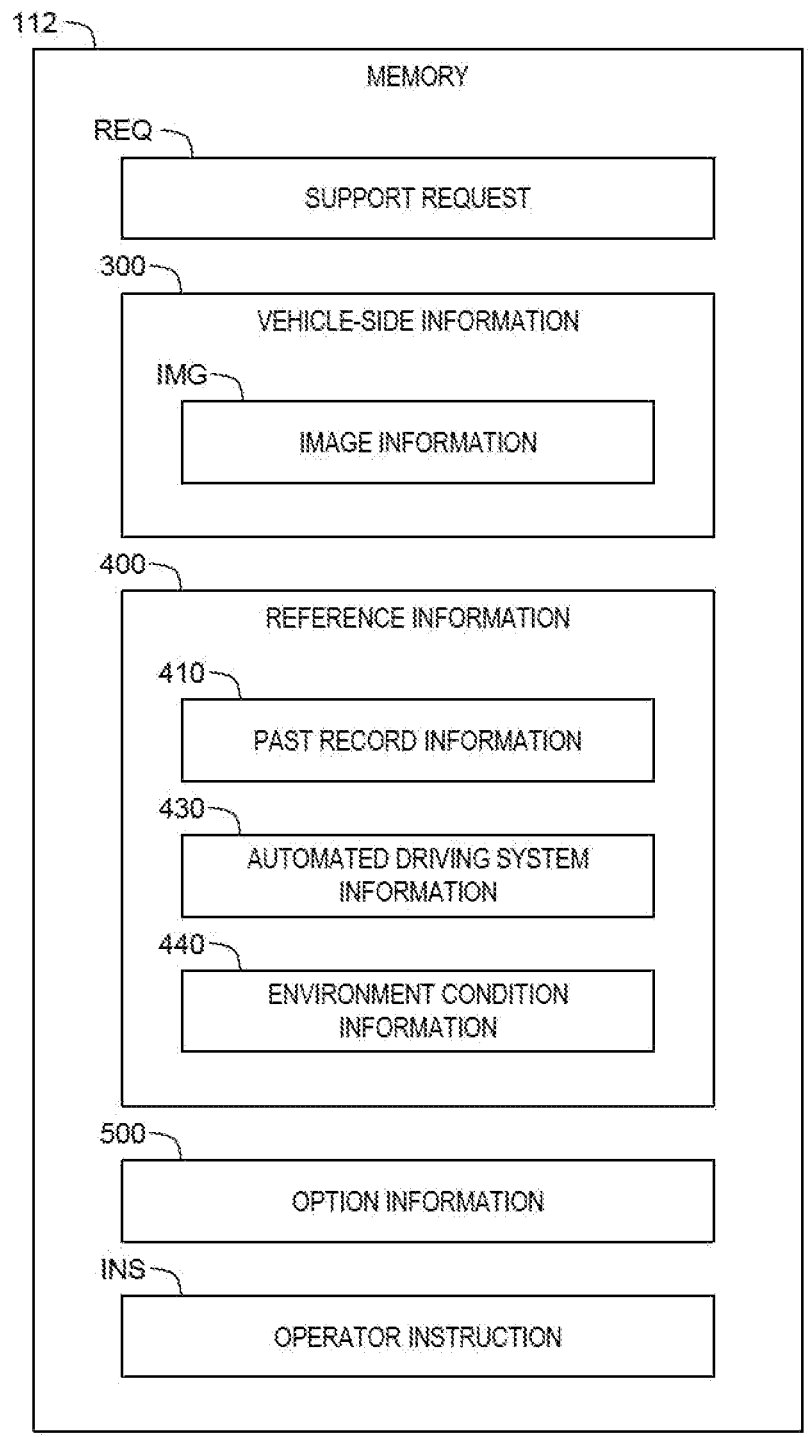
FIG. 10 is a block diagram showing an example of a variety of information related to a remote support process according to an embodiment of the present disclosure.

FIG. 10 is a block diagram showing a variety of information related to the remote support process according to the present embodiment. The variety of information is stored in the memory 112.

The support request REQ is transmitted from the target automated driving vehicle 1T. The processor 111 receives the support request REQ through the communication device 120.

Vehicle-side information 300 is the driving environment information 80 necessary for the remote support. The vehicle-side information 300 includes at least the image information IMG captured by camera 25. The vehicle-side information 300 may include not only the latest image information IMG but also the image information IMG in a certain period of time before the support request REQ is issued. The vehicle-side information 300 may include the vehicle state information 83. The vehicle-side information 300 is transmitted from the target automated driving vehicle 1T. The processor 111 receives the vehicle-side information 300 through the communication device 120.

Reference information 400 is information that is referred to in determining the recommendable option OPT1.

The reference information 400 includes past record information 410. The past record information 410 is information acquired from the past record database 200. More specifically, the past record information 410 indicates the past record related to the first scene in which the target automated driving vehicle 1T is placed. The processor 111 accesses the past record database 200 to acquire the past record information 410 from the past record database 200.

The reference information 400 may include automated driving system information 430. The automated driving system information 430 indicates a state of the automated driving system 10. For example, the automated driving system information 430 indicates whether it is immediately after an update of an automated driving software. The automated driving system information 430 may indicate accuracy of sensors such as the recognition sensor 20. The automated driving system information 430 may indicate whether the travel device 60 is normal or not. The automated driving system information 430 is transmitted from the target automated driving vehicle 1T. The processor 111 receives the automated driving system information 430 through the communication device 120.

The reference information 400 may include environment condition information 440. The environment condition information 440 indicates an environment in which the target automated driving vehicle 1T is placed. Examples of the environment include weather, weather conditions, time, season, congestion status, and the like. The environment condition information 440 is provided from an information service server or the target automated driving vehicle 1T. The processor 111 receives the environment condition information 440 through the communication device 120.

Option information 500 indicates the plurality of options OPT of the combination of the supported process and the delegated process. The plurality of options OPT include the recommendable option OPT1. The processor 111 generates the option information 500 by executing a process described later.

The operator instruction INS is an instruction from the operator to the target automated driving vehicle 1T. The operator instruction INS includes an instruction from the operator regarding the supported process. The operator instruction INS may also include designation of the delegated process. The operator inputs the operator instruction INS by the use of the input device 140. The processor 111 receives the operator instruction INS through the input device 140.

Figure 11:
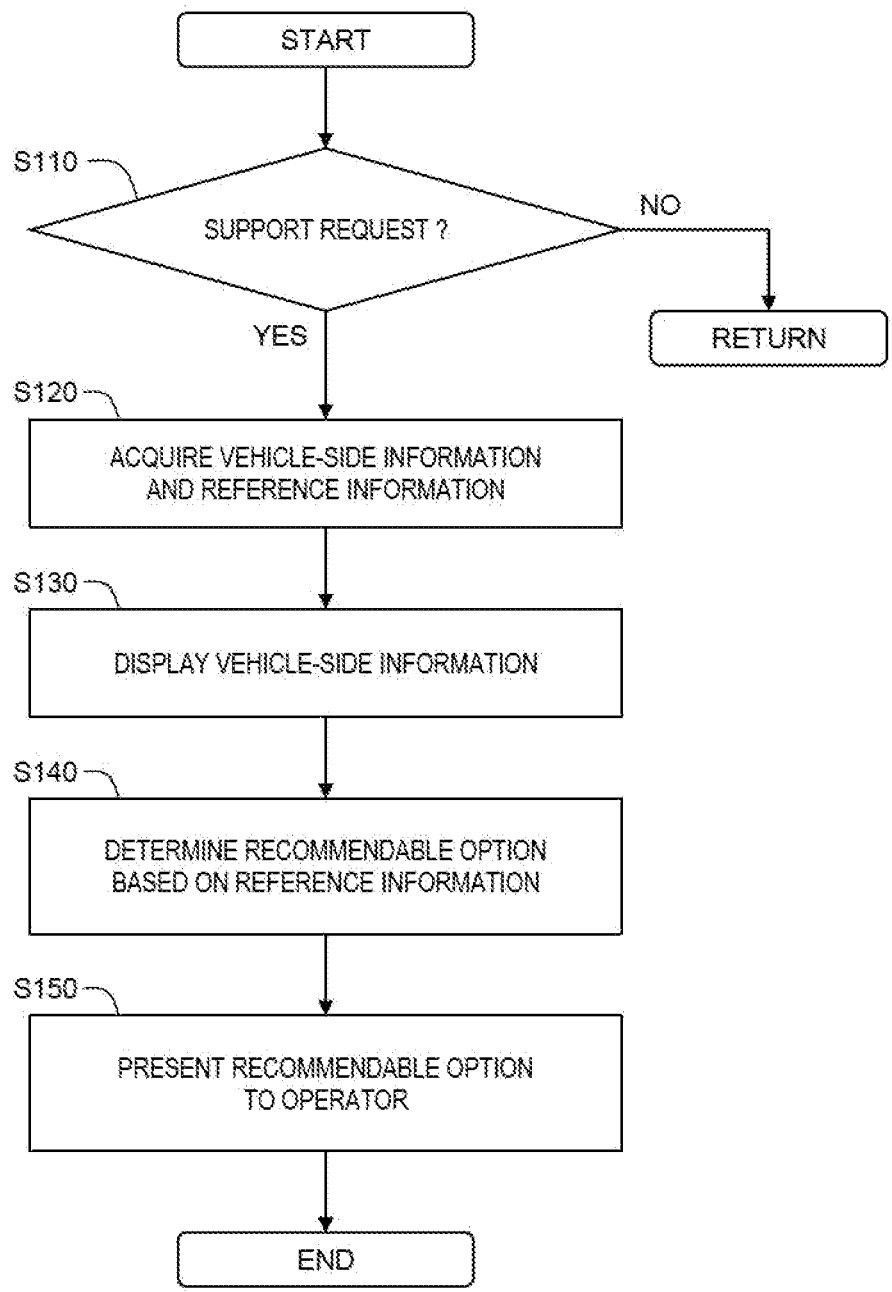
FIG. 11 is a flow chart showing an operator instruction request process in a remote support process according to an embodiment of the present disclosure.

FIG. 11 is a flow chart showing the operator instruction request process in the remote support process.

In Step S110, the processor 111 determines whether or not the support request REQ is received from the target automated driving vehicle 1T. When the support request REQ is received (Step S110; Yes), the processing proceeds to Step S120. Otherwise (Step S110; No), the processing in the current cycle ends.

In Step S120, the processor 111 acquires the vehicle-side information 300 and the reference information 400.

In Step S130, the processor 111 displays the vehicle-side information 300 on the display device 130. In particular, the processor 111 displays the image information IMG on the display device 130 (see FIG. 4).

In Step S140, the processor 111 sets a plurality of options OPT of the combination of the supported process and the delegated processes. Further, the processor 111 determines the recommendable option OPT1 to be recommended to the operator among the plurality of options OPT. Here, the processor 111 determines the recommendable option OPT1 based on the reference information 400 described above. Various examples of determination of the recommendable option OPT1 based on the reference information 400 will be described later. Through this process, the processor 111 generates the option information 500.

In Step S150, the processor 111 displays the option information 500 on the display device 130. Here, the processor 111 displays at least the recommendable option OPT1. The processor 111 may display the plurality of options OPT including the recommendable option OPT1. The processor 111 may display the plurality of options OPT such that the recommendable option OPT1 stands out from the other options OPT (see FIG. 4).

Figure 12:
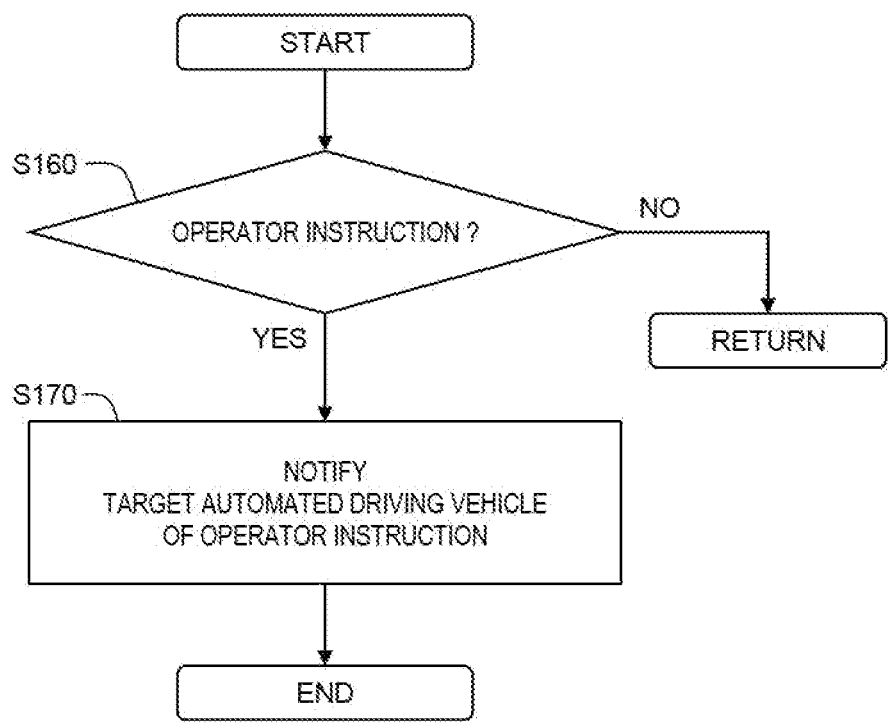
FIG. 12 is a flow chart showing an operator instruction notification process in a remote support process according to an embodiment of the present disclosure.

FIG. 12 is a flow chart showing the operator instruction notification process in the remote support process.

In Step S160, the processor 111 determines whether or not the operator instruction INS is input by the operator. When the operator instruction INS is input (Step S160; Yes), the processing proceeds to Step S170. Otherwise (Step S160; No), the processing in the current cycle ends.

In Step S170, the processor 111 communicates with the target automated driving vehicle 1T through the communication device 120 and notifies the target automated driving vehicle 1T of the operator instruction INS.

4-4. Examples of Recommendable Option Determination Process

Hereinafter, various examples of the recommendable option determination process (Step S140) will be described.

4-4-1. First Example

In a first embodiment, the processor 111 determines the recommendable option OPT1 based on the past record information 410. The past record information 410 indicates the past record related to the first scene in which the target automated driving vehicle 1T is.

For example, the past record includes the support request probability or the support request frequency for each of the plurality of vehicular processes. For convenience, any one of the plurality of vehicular processes is hereinafter referred to as a "first vehicular process." The processor 111 acquires the support request probability or the support request frequency regarding the first vehicular process from the past record information 410. Then, based on the support request probability or the support request frequency regarding the first vehicular process, the processor 111 determines whether to set the first vehicular process as the supported process or as the delegated process in the recommendable option OPT1.

For example, as the support request probability or the support request frequency regarding the first vehicular process becomes lower, a probability that the first vehicular process is set as the delegated process in the recommendable option OPT1 becomes higher. Conversely, as the support request probability or the support request frequency regarding the first vehicular process becomes higher, a probability that the first vehicular process is set as the supported process in the recommendable option OPT1 becomes higher.

As another example, the support request probability or the support request frequency may be compared with a predetermined threshold. When the support request probability or the support request frequency regarding the first vehicular process is equal to or higher than the predetermined threshold, the processor 111 sets the first vehicular process as the supported process in the recommendable option OPT1. On the other hand, when the support request probability or the support request frequency regarding the first vehicular process is lower than the predetermined threshold, the processor 111 sets the first vehicular process as the delegated process in the recommendable option OPT1.

In this manner, the content of the recommendable option OPT1 is determined based on the past record information 410. Since the past record information 410 indicates the past record of the support request process, it is possible to determine an appropriate recommendable option OPT1.

4-4-2. Second Example

In a second example, the past record of the support re-request process is taken into consideration. The processor 111 acquires the past record information 410 including the past record of the support re-request process (see FIG. 9) and determines the recommendable option OPT1 based on the past record of the support re-request process.

For example, the past record of the support re-request process includes the support re-request probability or the support re-request frequency. The processor 111 acquires the support re-request probability or the support re-request frequency from the past record information 410. Then, the processor 111 sets the supported process and the delegated process in the recommendable option OPT1 based on the support re-request probability or the support re-request frequency. For example, as the support re-request probability or the support re-request frequency increases, a ratio of the supported process in the recommendable option OPT1 increases and a ratio of the delegated process therein decreases. Conversely, as the support re-request probability or the support re-request frequency decreases, a ratio of the delegated process in the recommendable option OPT1 increases and a ratio of the supported process therein decreases.

4-4-3. Third Example

In a third example, the processor 111 determines the recommendable option OPT1 based on the automated driving system information 430.

For example, in a case where it is immediately after an update of the automated driving software, reliability of the past record decreases. Therefore, in this case, the processor 111 increases a ratio of the supported process in the recommendable option OPT1 and decreases a ratio of the delegated process therein.

As another example, in a case where the accuracy of the sensor such as the recognition sensor 20 is decreased, the accuracy of the automated driving control also is decreased. Therefore, in this case, the processor 111 increases a ratio of the supported process in the recommendable option OPT1 and decreases a ratio of the delegated process therein.

4-4-4. Fourth Example

In a fourth example, the processor 111 determines the recommendable option OPT1 based on the environment condition information 440.

For example, in a poor weather condition, there is a possibility that the accuracy of the recognition process is decreased and thus the accuracy of the automated driving control also is decreased. Therefore, the processor 111 increases a ratio of the supported process in the recommendable option OPT1 and decreases a ratio of the delegated process therein.

4-4-5. Fifth Example

It is also possible to combine some of the first to fourth examples.

What is claimed is:

1. A remote support system that remotely supports travel of an automated driving vehicle, wherein the automated driving vehicle executes: a plurality of vehicular processes including recognition and decision during automated driving; and a support request process that transmits, to the remote support system, a support request that requests for support for at least one of the plurality of vehicular processes, the remote support system comprising:
a past record database stored at the remote support system indicating a past record of the support request process by the automated driving vehicle for each scene; and
one or more processors programmed to execute:
an operator instruction request process that, in response to the support request transmitted from a target automated driving vehicle being in a first scene, requests an operator for an instruction to the target automated driving vehicle; and
an operator instruction notification process that notifies the target automated driving vehicle of the instruction from the operator, wherein
a supported process is a vehicular process performed by the operator instead of the target automated driving vehicle among the plurality of vehicular processes in the first scene,
a delegated process is a vehicular process that the operator delegates to the target automated driving vehicle among the plurality of vehicular processes in the first scene,
in the operator instruction request process, the one or more processors are further programmed to:
acquire the past record of the support request process related to the first scene from the past record database;
determine, based on the past record of the support request process related to the first scene, a recommendable option recommendable for the operator among a plurality of options of a combination of the supported process and the delegated process;
present at least the recommendable option to the operator;
transmit an operator instruction to the automated driving vehicle; and
control the automated driving vehicle based on the transmitted operator instruction.

2. The remote support system according to claim 1, wherein
the one or more processors are programmed to present the plurality of options including the recommendable option to the operator.

3. The remote support system according to claim 2, wherein
the one or more processors are programmed to present the plurality of options to the operator such that the recommendable option stands out from an option other than the recommendable option.

4. The remote support system according to claim 1, wherein
the past record includes a probability that or a frequency with which the support for each of the plurality of vehicular processes is requested,
the plurality of vehicular processes includes a first vehicular process,
the one or more processors are further programmed to:
acquire the probability that or the frequency with which the support for the first vehicular process is requested, from the past record related to the first scene; and
determine, based on the probability or the frequency acquired, whether to set the first vehicular process as the supported process or as the delegated process in the recommendable option.

5. The remote support system according to claim 4, wherein
as the probability that or the frequency with which the support for the first vehicular process is requested becomes lower, a probability that the first vehicular process is set as the delegated process in the recommendable option becomes higher.

6. The remote support system according to claim 4, wherein
the one or more processors are further programmed to:
set the first vehicular process as the supported process in the recommendable option, when the probability that or the frequency with which the support for the first vehicular process is requested is equal to or higher than a threshold; and
set the first vehicular process as the delegated process in the recommendable option, when when the probability that or the frequency with which the support for the first vehicular process is requested is lower than the threshold.

7. The remote support system according to claim 1, wherein
the support request process by the automated driving vehicle includes a support re-request process that retransmits, after receiving the instruction from the operator, the support request to the remote support system without following the received instruction,
the past record includes a probability or a frequency of the support re-request process,
the one or more processors are further programmed to:
acquire the probability or the frequency of the support re-request process from the past record related to the first scene; and
set the supported process and the delegated process in the recommendable option, based on the probability or the frequency acquired.

8. The remote support system according to claim 7, wherein
as the probability or the frequency of the support re-request process increases, a ratio of the supported process in the recommendable option increases.

9. The remote support system according to claim 1, wherein
the plurality of vehicular processes includes:
a recognition process that recognizes a situation around the automated driving vehicle;
an action decision process that decides, based on a result of the recognition process, whether or not to execute an action; and
a timing decision process that decides an execution timing of the action.

10. A remote support method that remotely supports travel of an automated driving vehicle, wherein the automated driving vehicle executes: a plurality of vehicular processes including recognition and decision during automated driving; and a support request process that transmits, to the remote support system, a support request that requests for support for at least one of the plurality of vehicular processes, and
a past record database stored at the remote support system that indicates a past record of the support request process by the automated driving vehicle for each scene,
the remote support method comprising:
an operator instruction request process that, in response to the support request transmitted from a target automated driving vehicle being in a first scene, requests an operator for an instruction to the target automated driving vehicle; and
an operator instruction notification process that notifies the target automated driving vehicle of the instruction from the operator, wherein
a supported process is a vehicular process performed by the operator instead of the target automated driving vehicle among the plurality of vehicular processes in the first scene,
a delegated process is a vehicular process that the operator delegates to the target automated driving vehicle among the plurality of vehicular processes in the first scene,
the operator instruction request process further includes:
acquiring the past record of the support request process related to the first scene from the past record database;
determining, based on the past record of the support request process related to the first scene, a recommendable option recommendable for the operator among a plurality of options of a combination of the supported process and the delegated process; and
presenting at least the recommendable option to the operator;
transmitting an operator instruction to the automated driving vehicle; and
controlling the automated driving vehicle based on the transmitted operator instruction.

* * * * *